United States Patent [19]

Baggett

[11] Patent Number: 5,528,846
[45] Date of Patent: Jun. 25, 1996

[54] APPARATUS FOR HELPING TO HOLD A DEVICE STEADY AS THE DEVICE IS POINTED AT A TARGET

[76] Inventor: Bruce W. Baggett, 627 Thomas St., Lewisburg, Tenn. 37091

[21] Appl. No.: 372,449

[22] Filed: Jan. 13, 1995

[51] Int. Cl.[6] .................................................... F41A 35/00
[52] U.S. Cl. .................................................. 42/94; 224/913
[58] Field of Search ............................. 42/94; 89/37.04; 224/185, 257, 908, 909, 913, 270, 271, 272; 354/293

[56] References Cited

U.S. PATENT DOCUMENTS

| 74,119 | 2/1868 | Muller | 42/94 |
|---|---|---|---|
| 817,207 | 4/1906 | Wheeler | 224/257 |
| 889,658 | 6/1908 | Burnaugh, Jr. . | |
| 1,406,827 | 2/1922 | Dumas . | |
| 1,497,794 | 6/1924 | Saunders | 42/94 |
| 2,552,205 | 5/1951 | Moss | 224/908 |
| 2,711,122 | 6/1955 | Klumpp | 224/257 |
| 2,771,826 | 11/1956 | Shapiro | 354/293 |
| 3,191,826 | 6/1965 | Adams | 224/913 |
| 3,200,528 | 8/1965 | Christensen | 42/94 |
| 3,390,477 | 7/1968 | Galbraith | 42/94 |
| 3,661,308 | 5/1972 | Walters | 224/908 |
| 4,083,480 | 4/1978 | Lee et al. | 354/293 |
| 4,327,986 | 5/1982 | Carter | 354/293 |
| 4,637,536 | 1/1987 | Wong | 224/909 |
| 4,844,390 | 7/1989 | Duke | 248/118 |
| 4,858,359 | 8/1989 | Danz | 42/94 |
| 4,890,406 | 1/1990 | French | 42/90 |
| 4,991,758 | 2/1991 | Eaneff | 224/257 |
| 5,194,678 | 3/1993 | Kramer | 42/94 |
| 5,241,771 | 9/1993 | Caustic | 42/94 |
| 5,351,867 | 10/1994 | Vest | 42/94 |

FOREIGN PATENT DOCUMENTS

| 79418 | 6/1894 | Germany | 42/94 |
|---|---|---|---|
| 478628 | 2/1928 | Germany | 42/94 |

*Primary Examiner*—Michael J. Carone
*Assistant Examiner*—Theresa M. Wesson
*Attorney, Agent, or Firm*—Walker, McKenzie & Walker

[57] ABSTRACT

An apparatus for allowing a user to hold a device, such as a gun, steady while pointing that device at a target. The apparatus includes a base; attachment structure for attaching the base firmly against a portion of the user's body; and a rod attached to the base for being held by the user against or relative to the device.

9 Claims, 2 Drawing Sheets

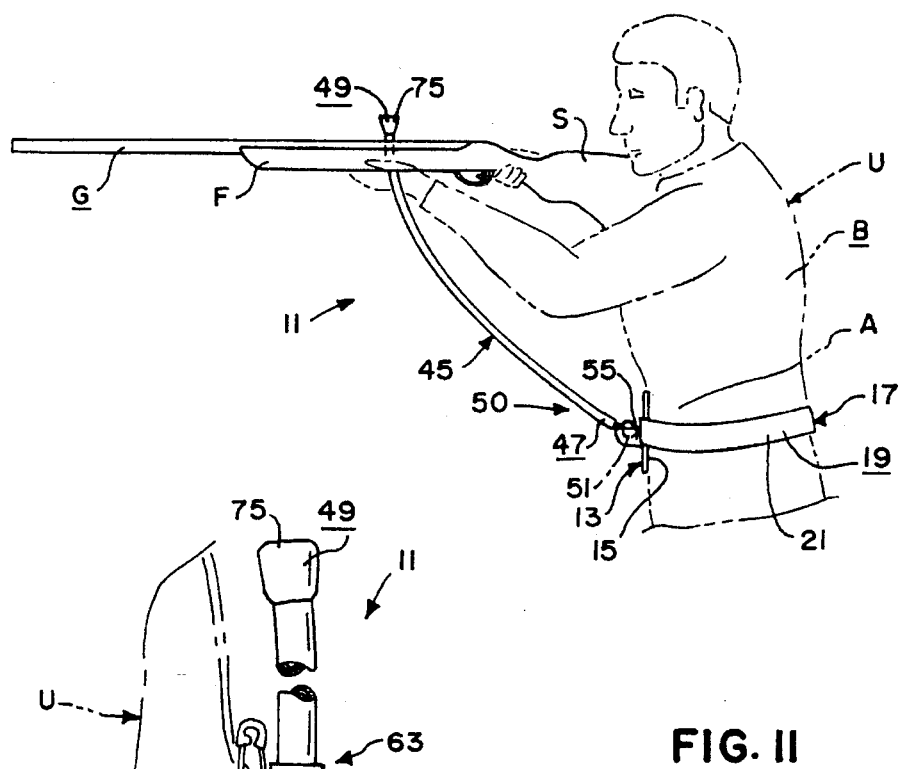
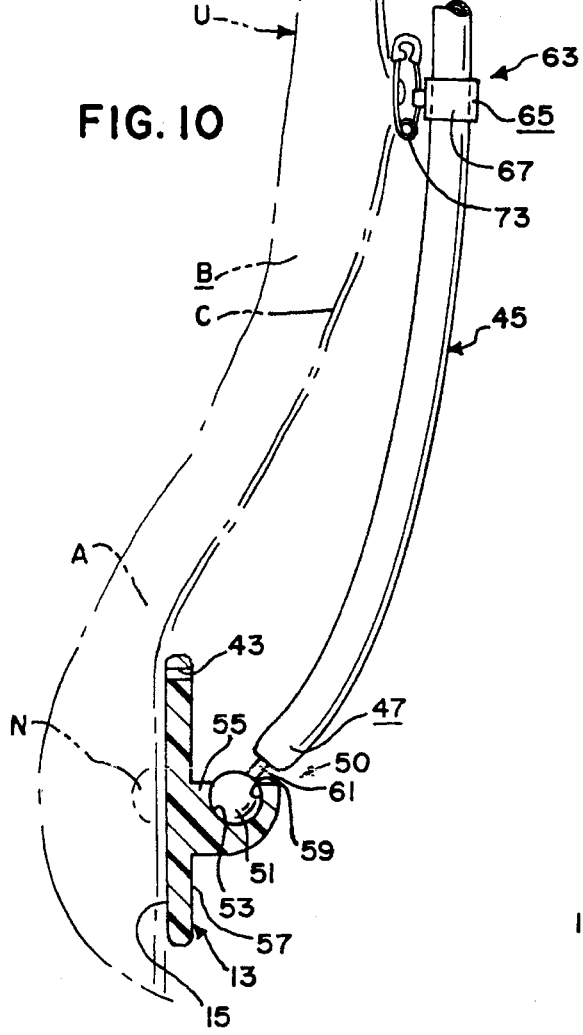
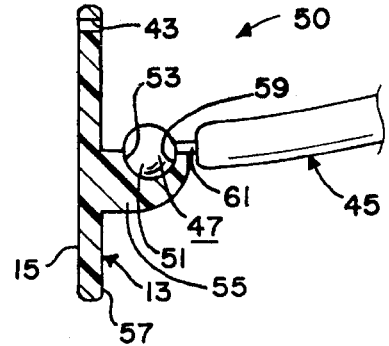
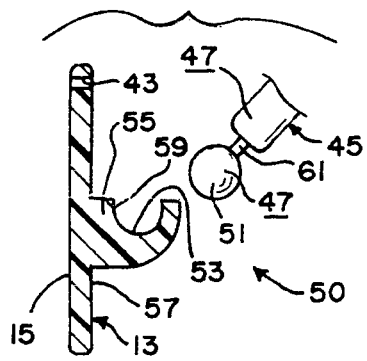

APPARATUS FOR HELPING TO HOLD A DEVICE STEADY AS THE DEVICE IS POINTED AT A TARGET

BACKGROUND OF THE INVENTION

1. Field of the Invention

The present invention relates, in general, to an apparatus for helping to hold a device such as a gun, telescope, camera, etc., steady as the device is pointed at a target or aimed.

2. Information Disclosure Statement

It is often desirable to use auxiliary means such as tripods or the like to hold devices such as guns, telescopes, binoculars, cameras, etc., steady as such devices are pointed at targets or aimed. It is common for hunters and the like to hold such devices against any available support such as tree trunks, fence posts, etc., when aiming such devices.

A preliminary patentability search conducted in class 42, subclass 94, produced the following patents which appear to be relevant to the present invention:

Burnaugh, U.S. Pat. No. 889,658, issued Jun. 2, 1908, discloses a folding gun rest for being attached to a user's body and for supporting a firearm when taking aim.

Dumas, U.S. Pat. No. 1,406,827, issued Feb. 14, 1922, discloses a gun rest including a base member for engaging the user's belt, a spacing rod hingedly connected to the base member, a rest bar attached to the spacing rod, and a flexible gun rest connected to the spacing rod and bendable on the rest bar.

Christensen, U.S. Pat. No. 3,200,528, issued Aug. 17, 1965, discloses a device for supporting a pistol on a belt.

Galbraith, U.S. Pat. No. 3,390,477, issued Jul. 2, 1968, discloses a supporting device for sighting firearms.

Duke, U.S. Pat. No. 4,844,390, issued Jul. 4, 1989, discloses an arm rest for supporting an extended upper arm. The arm rest attaches to the belt of a hunter and extends upward to an arm pad upon which a hunter rests his upper arm while aiming at a target.

Caustic, U.S. Pat. No. 5,241,771, issued Sep. 7, 1993, discloses a steady-hold shooters rest including an elliptical armrest bar and top deck molded to a solid body support bracket which is in turn fastened around the waist of a shooter and positioned directly in front of the shooter so that the armrest bar extends to the shooter's sides at close proximity while extending at greater distance from the shooter's body as it approaches the center point of the rest. To use the rest, the shooter's arm supporting the weapon is placed in contact with the armrest bar or the solid top deck of the rest.

Nothing in the known prior art discloses or suggests the present invention. More specifically, nothing in the known prior art discloses or suggests an apparatus including a base, attachment means for attaching the base firmly against a portion of the user's body, and an elongated rod attached to the base for being held by the user against or relative to a device being aimed to help hold the device steady as the device is pointed at a target.

SUMMARY OF THE INVENTION

The present invention provides an apparatus for helping to hold a device such as a gun, telescope, camera, etc., steady as the device is pointed at a target or aimed.

The apparatus of the present invention includes, in general, a base; attachment means for attaching the base firmly against a portion of a user's body; and an elongated rod attached to the base for being held by the user against or relative to a device being aimed to help hold the device steady as the device is pointed at a target.

One object of the present invention is to provide an apparatus that allows a person to hold devices such as guns, telescopes, binoculars, cameras, etc., steady while pointing or aiming such devices at a target.

Another object of the present invention is to provide such an apparatus that can be secured about the user's waist.

Another object of the present invention is to provide such an apparatus that, after being secured to a user's body, has only one moving part.

Another object of the present invention is to provide such an apparatus that can be used quickly and quietly.

Another object of the present invention is to provide such an apparatus that does not need to be repositioned when the user moves between a walking or standing position to a sitting or kneeling position, and vice versa.

Another object of the present invention is to provide such an apparatus that can be used while the user carries objects such as backpacks, tree stands, etc. on the user's back.

Another object of the present invention is to provide such an apparatus that is designed to accommodate the user's stomach.

Another object of the present invention is to provide such an apparatus that includes a ball-and-socket arrangement to allow easy left, right, circular, and fore and aft adjustment.

Another object of the present invention is to provide such an apparatus that can be secured to the user by a belt or a chest harness.

Another object of the present invention is to provide such an apparatus that can be held in an out-of-use position by a clamp or clip attached to the user's clothing or to a chest harness.

Another object of the present invention is to provide such an apparatus that can be moved to the in-use position by one hand before or after the user brings the device to be held steady to the desired position.

BRIEF DESCRIPTION OF THE DRAWINGS

FIG. 9 is a side elevational view of the apparatus of the present invention shown in combination with a user and a device being aimed.

FIG. 10 is a somewhat diagrammatic view of a portion of the apparatus of the present invention showing the base, rod and clamp joined to one another with portions thereof broken away for clarity and shown in combination with a user.

FIG. 11 is similar to a portion of FIG. 10 but showing the rod in moved position relative to the base.

FIG. 12 is an exploded view of the components of FIG. 10.

DESCRIPTION OF THE PREFERRED EMBODIMENT

Figure 1:
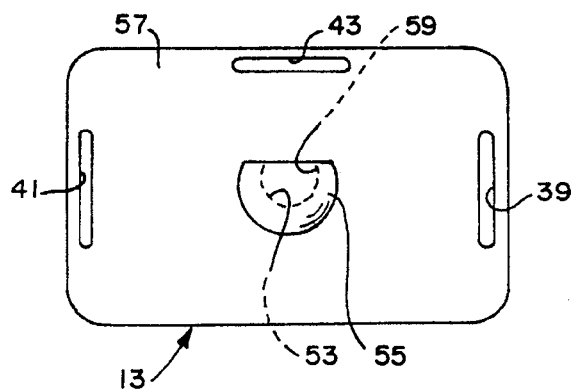
FIG. 1 is a front elevational view of a base of the apparatus of the present invention.
Figure 2:
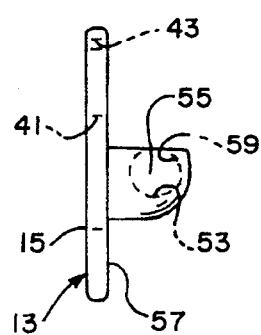
FIG. 2 is a side elevational view of the base of FIG. 1.
Figure 3:
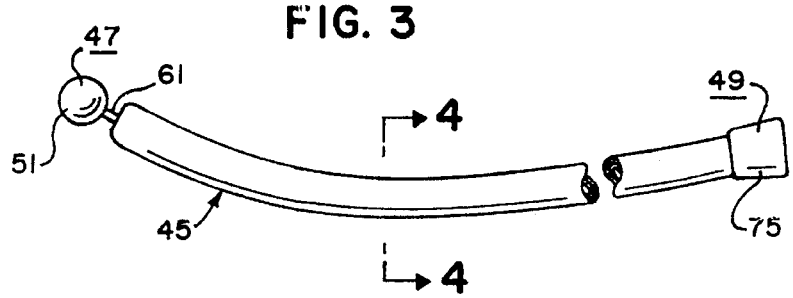
FIG. 3 is a side elevational view of the rod of the apparatus of the present invention with portions thereof broken away for clarity.
Figure 4:
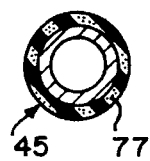
FIG. 4 is a sectional view of the rod of FIG. 3 substantially as taken on line 4—4 of FIG. 3 on a somewhat enlarged scale with portions thereof omitted for clarity.

The preferred embodiment of the apparatus of the present invention is shown in FIGS. 1–12, and identified by the numeral 11. The apparatus 11 is used to help a user U hold devices such as gun, telescopes, binoculars, cameras, etc., steady as such devices are pointed at a target. The apparatus 11 is especially designed to help user U such as a hunter or target shooter hold a gun G such as a rifle or shotgun steady as the gun G is pointed at a target, aimed and/or shot.

The apparatus 11 includes a base 13 for being held firmly against a portion of the body B of the user U. The base 13 preferably has a substantially planar rear face 15 for being pressed against and held firmly against the abdomen A of the body B of the user U. When properly positioned for optimum support, the rear face 15 is preferably centered in front of the navel N of the body B of the user U.

The apparatus 11 includes attachment means 17 for attaching the base 13 firmly against a portion of the body B of the user U (e.g., centered in front of the navel N of the body B of the user U as clearly shown in FIGS. 9 and 10).

Figure 7:
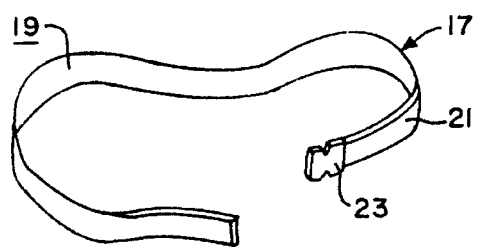
FIG. 7 is a perspective view of a first embodiment of an attachment means of the apparatus of the present invention.
Figure 5:
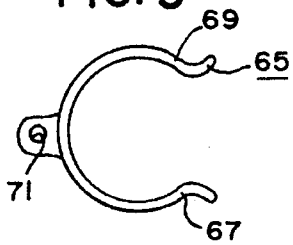
FIG. 5 is a top plan view of a clamp of the apparatus of the apparatus of the present invention.

A first embodiment of the attachment means 17 is shown in FIGS. 7 and 9 and consist of a belt 19 for being attached to the base 13 and for passing around the body B of the user U. The belt 19 preferably includes an elongated band member 21 for extending generally about the waist of the body B of the user U, and an adjustment means 23 such as a buckle or the like for securing the band member 21 about the body B of the user U.

Figure 8:
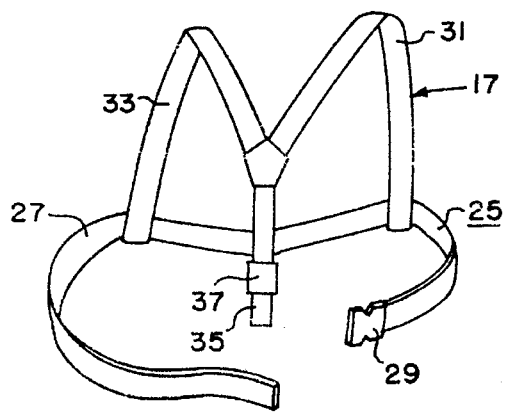
FIG. 8 is a perspective view of a second embodiment of an attachment means of the apparatus of the present invention.
Figure 6:
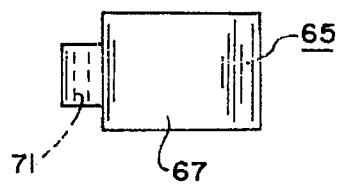
FIG. 6 is a side elevational view of the clamp of FIG. 5.

A second embodiment of the attachment means 17 is shown in FIG. 8 and consist of a chest harness 25 for being attached to the base 13 and for passing over the chest of the body B of the user U. Thus, the chest harness 25 may include an elongated band member 27 for extending generally about the waist of the body B of the user U, a first adjustment means 29 such as a buckle or the like for securing the band member 27 about the body B of the user U, a first shoulder member 31 for extending over one shoulder of the body B of the user U, and a second shoulder member 33 for extending over the other shoulder of the body B of the user U. Each shoulder member 31, 33 has one end attached to the band member 27 and a second end joined together to form a tag end 35. A second adjustment means 37 such as a buckle or the like is provided at the tag end 35 to adjust the length of the tag end 35 for reasons which will hereinafter become apparent.

The base 13 preferably has a first slot 39 therethrough adjacent one side edge thereof and a second slot 41 therethrough adjacent the other side edge thereof (see, in general, FIG. 1) for allowing the elongated band member 21 of the belt 19 or the elongated band member 27 of the chest harness 25 to pass therethrough in a manner as will now be apparent to those skilled in the art to thereby fasten the base 13 about the body B of the user U. The base 13 preferably has a third slot 43 therethrough adjacent the top edge thereof for allowing the tag end 35 of the chest harness 25 to pass therethrough in a manner as will now be apparent to those skilled in the art.

The apparatus 11 includes an elongated rod 45 attached to the base 13 for being held by the user U against or relative to the device being aimed (e.g., against the gun G as shown in FIG. 9). The rod 45 has a first end 47 for attachment to the base 13 and a second end 49. The first end 47 of the rod 45 is preferably movably attached to the base 13 to allow adjustment of the elongated rod 45 relative to the device being aimed (e.g., relative to the gun G).

The apparatus 11 preferably includes means 50 for movably attaching the rod 45 to the base 13 to allow the user U to adjust the position of the rod 45 relative to the device being aimed (e.g., relative to the gun G). More specifically, the first end 47 of the rod 45 is preferably pivotally attached to the base 13 to allow the user U to move the second end 49 of the rod 45 relative to the base 13. Thus, for example, the first end 47 of the rod 45 may be connected to the base 13 by one or more pivot rods, U-joints or the like. As shown in FIGS. 1–3 and 9–12, the means 50 may include a ball-and-socket joint to allow the second end 49 of the rod 45 to be easily moved left, right, and fore and aft and in a circular direction. Thus, the first end 47 of the rod 45 preferably has or consists of a spherical ball 51 and the base 13 preferably has a socket 53 for movably receiving the ball 51 of the first end 47 of the rod 45 to provide a 360° range of motion of the rod 45.

The socket 53 is preferably formed in a boss 55 protruding from the front face 57 of the base 13. The socket 53 preferably has a mouth opening 59 angled upward and outward relative to the front face 57 of the base 13 to allow the rod 45 to extend generally outwardly and upwardly from the front face 57 of the base 13 as clearly shown in FIGS. 9–12.

The rod 45 may have a reduced neck portion 61 between the spherical ball 51 and the remainder of the rod 45 to increase the range of movement of the rod 45 relative to the mouth opening 59 of the socket 53 as will now be apparent to those skilled in the art.

The apparatus 11 preferably includes holding means 63 for holding the rod 45 in a non-use position substantially against the chest of the user U as shown generally in FIG. 10. The holding means 63 preferably includes a clamp 65 having resilient or elastic arms 67, 69 for encircling a portion of the rod 45 as shown diagrammatically in FIG. 5. Thus, the arms 67, 69 preferably spring apart when the rod 45 is manually forced therebetween into the clamp 65 or pulled from the clamp 65 as will now be apparent to those skilled in the art. The holding means 63 may be secured relative to the chest of the user U in various manners now apparent to those skilled in the art. Thus, for example, the clamp 65 may have an aperture 71 through a portion thereof and the holding means 63 may include a safety pin 73 or the like for extending through the aperture 71 and a portion of the clothing C of the user U adjacent the chest of the user U as shown in FIG. 10 or a portion of one of the shoulder members 31, 33 of the chest harness 25, etc., as will now be apparent to those skilled in the art. The holding means 63 could be designed integral with the base 13 so that the separate clamp 65 is not needed.

The base 13 may be manufactured in various manners, out of various materials, and in various sizes as will now be apparent to those skilled in the art. Thus, for example, the base 13 may be molded out of plastic as a one-piece, integral unit with the mouth opening 59 of the socket 53 sized so that the ball 51 of the first end 47 of the rod 45 can be snapped therethrough, into the socket 53 as will now be apparent to those skilled in the art. On the other hand, the mouth opening 59 may be sized to allow the ball 51 to freely pass therethrough and a snap-ring or the like might be provided for coacting with the mouth opening 59 to entrap the ball 51 within the socket 53 as will now be apparent to those skilled in the art.

The attachment means 17 may also be manufactured in various manners, out of various materials, and in various sizes as will now be apparent to those skilled in the art. Thus, for example, the belt 19 may consist of an off-the-shelf belt sized to fit the user U and extend through the slots 39, 41 in the base 13, or may be custom made from nylon webbing and standard buckles and the like, etc. Likewise, the chest harness 25 may be an off-the-shelf item sized to fit the user U and extend through the slots 39, 41, 43 in the base 13, or may be custom made from nylon webbing and standard buckles and the like, etc.

The rod 45 may also be manufactured in various manners, out of various materials, and in various sizes as will now be apparent to those skilled in the art. Thus, for example, the rod 45 may be molded or otherwise formed from a substantially rigid plastic or metal tube or pipe with the ball 51 molded or otherwise formed as a separate part press-fitted or otherwise securely attached to one end of such tube or pipe, and with a cap 75 closing the other end of such tube or pipe and forming the second end 49 of the rod 45. The rod 45 is preferably curved between the first and second ends 47, 49 thereof as clearly shown in FIGS. 3, 9 and 10 to accommodate stomach, etc., of the user U as illustrated in FIG. 10. The rod 45 may include a sound absorbing coating 77 such as foam rubber or the like over the tube or pipe. The rod 45 may be manufactured as a telescopic unit out of two or more members to allow the length thereof to be adjusted by the user U as will now be apparent to those skilled in the art.

The clamp 65 of the holding means 63 may also be manufactured in various manners, out of various materials, and in various sizes as will now be apparent to those skilled in the art. Thus, for example, the clamp 65 may be molded or otherwise formed out of plastic in a size to springably receive the rod 45. The safety pin 73 of the holding means 63 preferably consist of a typical off-the-shelf safety pin.

The use and operation of the apparatus 11 should now be apparent to those skilled in the art. The first step is to attach the base 13 to a portion of the body B of the user U, preferably pressed firmly against the abdomen A of the body B of the user U, centered in front of the navel N of the body B of the user U. The base 13 may be attached using either the belt 19 or the chest harness 25. The holding means 63 is attached either to clothing worn by the user U or to one of the shoulder members 31, 33 of the chest harness 25 by a safety pin 73 or the like at any specific location desired by the user U depending on whether the user is left-handed, right-handed, etc. The rod 45 can then be manually forced into the clamp 65 so that the rod 45 will be held in a non-use position against the body B of the user U. The user U can then walk, sit, kneel, run, and move between standing and sitting positions, etc., without moving the rod 45 from the clamp 65. When the user U desires to use the apparatus 11 to help hold a device such as the gun G steady as the device is aimed or pointed at a target, the user U merely grabs the rod 45 with one hand, manually removes the rod 45 from the clamp 65 and moves the rod 45 to an in-use position against the device (e.g., against the forearm F of the gun G as shown in FIG. 9. With respect to a gun G such as rifle or shotgun as shown in FIG. 9, the user U can either bring the rod 45 against the forearm F of the gun G as the butt end of the stock S of the gun G is brought against the shoulder of the user U or can bring the rod 45 against the forearm F of the gun G after the butt end of the stock S of the gun G is brought against the shoulder of the user U by letting go of the forearm F of the gun G and reaching back to the rod 45, etc. In either case, with the gun G held by the user's U two hands, with the butt end of the stock S of the gun G held against the user's U shoulder, with the rod 45 held against the forearm F of the gun G, and with the base 13 attached firmly against the user's U body B, centered in front of the user's U navel N, the user U can hold the gun G steady as the gun G is pointed toward a target or aimed for long periods of time.

Although the present invention has been described and illustrated with respect to preferred embodiments and preferred uses therefor, it is not to be so limited since modifications and changes can be made therein which are within the full intended scope of the invention.

I claim:

1. An apparatus for helping a user to hold a device steady as the device is pointed at a target; said apparatus comprising:

(a) a base;

(b) attachment means for attaching said base firmly against a portion of the user's body;

(c) an elongated rod attached to said base for being held by the user relative to the device being aimed; said rod having a first end, a second end, and a midportion between said first and second ends;

(d) means for movably attaching said first end of said rod to said base and for allowing the user to move said rod between a non-use position with said midportion of said rod substantially against the user's chest and an in-use position with said midportion of said rod away from the user's chest; and (e) holding means for engaging said midportion of said rod and for holding said rod in said non-use position substantially against the user's chest.

2. The apparatus of claim 1 in which said rod is curved.

3. The apparatus of claim 1 in which said attachment means includes a ball on said first end of said rod; and in which said attachment means has a socket in said base for movably receiving said ball on said first end of said rod to allow a 360° range of motion of said rod.

4. The apparatus of claim 1 in which said rod has a sound absorbing coating.

5. The apparatus of claim 1 in which said attachment means includes a belt for encircling the user's waist and for holding said base firmly against the user's abdomen in front of the user's navel.

6. The apparatus of claim 1 in which said attachment means includes a chest harness for passing over the user's chest.

7. An apparatus for helping a user to hold a gun steady as the gun is pointed at a target; said apparatus comprising:

(a) a base including a substantially planar rear face for being pressed against the abdomen of the body of the user centered in front of the navel of the body of the user and including a front face having a socket therein;

(b) attachment means for attaching said base firmly against the user's abdomen in front of the user's navel; said attachment means including a belt for engaging said base and encircling the user's waist;

(c) an elongated rod for being held by the user against the gun being aimed; said rod having a first end, a second end, and a midportion between said first and second ends; said midportion of said rod is curved between said first and second ends; and said first end of said rod having a ball movably received in said socket of said base for allowing the user to move said rod between a non-use position with said midportion of said rod substantially against the user's chest and an in-use position with said midportion of said rod away from the user's chest; and (d) holding means for gripping said midportion of said rod and for holding said rod in said non-use position substantially against the user's chest.

8. The apparatus of claim 7 in which said rod has a sound absorbing coating.

9. The apparatus of claim 7 in which said attachment means includes a chest harness for engaging said base and passing over the user's chest.

* * * * *